United States Patent
Wu

(10) Patent No.: US 7,332,872 B2
(45) Date of Patent: Feb. 19, 2008

(54) EXTERNAL ELECTRONIC CONTROL TYPE ELECTRODELESS LAMP

(75) Inventor: Chao-Lin Wu, Tainan Science Park (TW)

(73) Assignee: Wujy Lighting Co., Ltd., Tainan County (TW)

( * ) Notice: Subject to any disclaimer, the term of this patent is extended or adjusted under 35 U.S.C. 154(b) by 0 days.

(21) Appl. No.: 11/584,617

(22) Filed: Oct. 23, 2006

(65) Prior Publication Data

US 2007/0103091 A1    May 10, 2007

(30) Foreign Application Priority Data

Nov. 10, 2005   (TW) .............................. 94219444 U

(51) Int. Cl.
*H05B 41/24* (2006.01)
(52) U.S. Cl. ........................ 315/248; 315/344; 313/153
(58) Field of Classification Search ................ 315/246, 315/248, 344; 313/484, 485, 153, 155, 493, 313/607
See application file for complete search history.

(56) References Cited

U.S. PATENT DOCUMENTS

| | | | | |
|---|---|---|---|---|
| 5,063,333 A | * | 11/1991 | Linden-Smith et al. | 315/344 |
| 5,592,047 A | * | 1/1997 | Park et al. | 313/484 |
| 6,255,782 B1 | * | 7/2001 | Kuroda et al. | 315/169.1 |
| 6,646,391 B2 | * | 11/2003 | Okamoto et al. | 315/246 |
| 2005/0189879 A1 | * | 9/2005 | Minamoto et al. | 313/607 |

* cited by examiner

Primary Examiner—Douglas W. Owens
Assistant Examiner—Ephrem Alemu
(74) Attorney, Agent, or Firm—Rosenberg, Klein & Lee

(57) ABSTRACT

An external electronic control type electrodeless lamp includes a lighting device. The lighting device includes a body having at least a first conductive plate and a second conductive plate. Each conductive plate is electrically connected to an electronic control system external to the lighting device. The body has a plurality of even-numbered sides. The number of the sides of the body is at least four. The conductive plates are mounted on at least two opposite sides of the body. The electronic control system includes a magnetic core that, when energized, creates a magnetic field, and current generated due to change in the magnetic field is supplied to the conductive plates to light the lighting device.

10 Claims, 8 Drawing Sheets

EXTERNAL ELECTRONIC CONTROL TYPE ELECTRODELESS LAMP

BACKGROUND OF THE INVENTION

1. Field of the Invention

The present invention relates to an external electronic control type electrodeless lamp and, more particularly, to an electrodeless lamp that utilizes magnetic core to create a magnetic field, and current generated due to change in the magnetic field is supplied to conductive plates for lighting purposes.

2. Description of the Related Art

Lighting instruments are a necessity in daily life. Fluorescent lamps, mercury lamps, and current electronic energy-saving lamps have been provided to meet different stable illumination needs through various designs for the purposes of best illumination effects. Electrodeless lamps utilizing electromagnetic induction effect have been developed and include a magnetic core in a lighting device (i.e., a lighting body such as a lamp, lamp shade, electroluminescent lamp, or bulb, or an interface for light source output) to create induction current. Electrodeless lamps are named for not utilizing electrodes to convert external energy into energy required for operation inside the lighting device. Such electrodeless lamps create alternating magnetic field that generates induction current in the lighting device, which results in discharge of the vapor mixture of low-pressure mercury and inert gas, and visible light can be seen through conversion by fluorescent powders. Since less heat is generated, the electrodeless lamps are durable and, thus, popular.

However, the lighting device of the conventional electrodeless lamps is limited in size and shape, for the magnetic core is mounted in the lighting device. Miniaturization of the lighting device is limited. Applicant's Taiwan Patent Application No TW 94219444 filed on Nov. 10, 2005 discloses an external electronic control type electrodeless lamp including a lighting device that has at least a first conductive plate and a second conductive plate each of which is electrically connected to an external electronic control system in which a magnetic core is mounted. The magnetic core, when energized, creates a magnetic field, and current generated due to change in the magnetic field is supplied to the conductive plates, thereby lighting the lighting device.

However, it was found that distribution of the magnetic lines of force of the first and second conductive plates in the lighting device is in pairs or in the same direction. There is, therefore, a need for improvement in the distribution of the magnetic line of force.

SUMMARY OF THE INVENTION

In view of the drawbacks of the prior art, an objective of the present invention is to provide an external electronic control type electrodeless lamp including a lighting device. The lighting device includes a body having at least a first conductive plate and a second conductive plate. Each conductive plate is electrically connected to an electronic control system external to the lighting device. The body has a plurality of even-numbered sides. The number of the sides of the body is at least four. The conductive plates are mounted on at least two opposite sides of the body. The electronic control system includes a magnetic core that, when energized, creates a magnetic field, and current generated due to change in the magnetic field is supplied to the conductive plates to light the lighting device. Since the conductive plates are mounted on at least two opposite sides of the body of the lighting device, the magnetic fields generated cross each other. Namely, a net-like distribution of the magnetic lines of force different from conventional designs is provided, thereby attaining a synergism effect. Further, since the magnetic core is mounted in the electronic control system external to the lighting device, flexible designs of the lighting device are allowed. Namely, the size and shape of the lighting device may vary while allowing miniaturization of the lighting device.

Another objective of the present invention is to mount the magnetic core in the electronic control system such that the lighting device is indirectly lit by each conductive plate through current generated due to change in the magnetic field. Hence, supply of electrical energy is gentle and less heat is generated, avoiding damage to the elements and prolonging the life of the lighting device.

A further objective of the present invention is to provide gentle supply of electrical energy while enhancing average output and overall efficiency.

Still another objective of the present invention is to provide a lighting device that is separate from an electronic control system having a magnetic core, allowing the electronic control system to connect with other lighting devices and providing flexible design as well as separate control effects for the lighting devices.

Other objectives, advantages, and features of the invention will become more apparent from the following detailed description when taken in conjunction with the accompanying drawings.

DETAILED DESCRIPTION OF THE PREFERRED EMBODIMENTS

Figure 1:
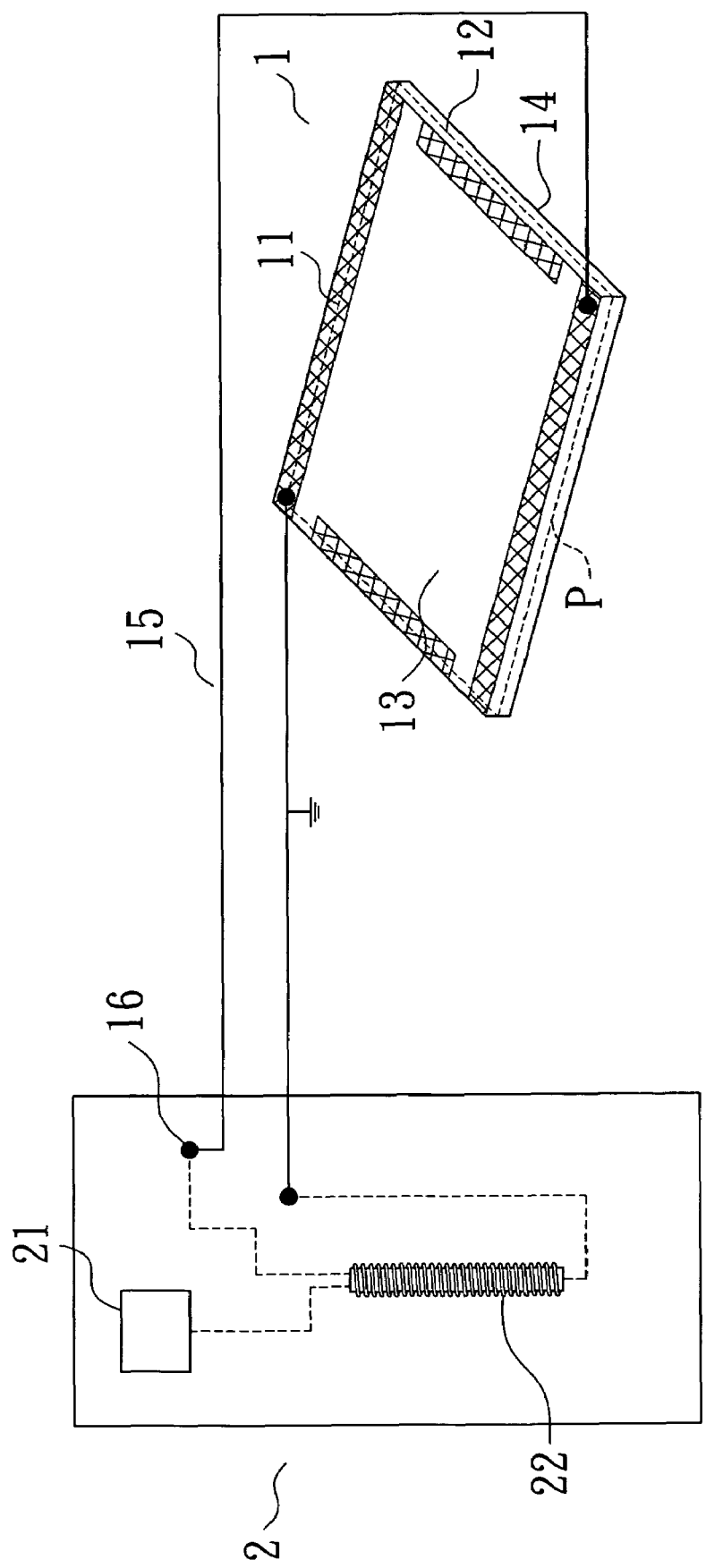
FIG. 1 is a schematic diagram illustrating a first embodiment of an external electronic control type electrodeless lamp in accordance with the present invention.

Referring to FIG. 1, a first embodiment of an external electronic control type electrodeless lamp in accordance with the present invention comprises a lighting device 1 and an electronic control system 2 external to the lighting device 1. The term "lighting device" means a lighting body such as a lamp, lamp shade, electroluminescent lamp, or bulb, or an interface for light source output. Other conventional circuits and fluorescent powders not directly in association with the subject matter of the present invention are not illustrated for clarity.

The lighting device 1 includes a body having a plurality of even-numbered sides. The number of the sides of the body is at least four. Namely, the body may be rectangular, square, hexagonal, octagonal, etc. Conductive plates 11 are mounted on at least a pair of the sides of the body opposite to each other. Each conductive plate 11 is electrically connected to the electronic control system 2 external to the lighting device 1. The electronic control system 2 includes a magnetic core 22 mounted therein. The magnetic core 2, when energized, creates a magnetic field, and current generated due to change in the magnetic field is supplied to the conductive plates 11 for lighting purposes.

In this example, the lighting device 1 is a plate-type lamp. More specifically, the lighting device 1 includes a first plate 13 and a second plate 14 that are coupled together and that are supported by a frame 12, providing an interior space P in the lighting device 1. Two conductive plates 11 adjacent to each other have a gap therebetween.

The electronic control system 2 includes a circuit device 21 for electrical connection with the magnetic core 22. When energized, the magnetic core 22 creates a magnetic field, and current generated due to change in the magnetic field is supplied via contacts 16 and wires 15 to each conductive plate 11 for lighting the lighting device 1.

Figure 2:
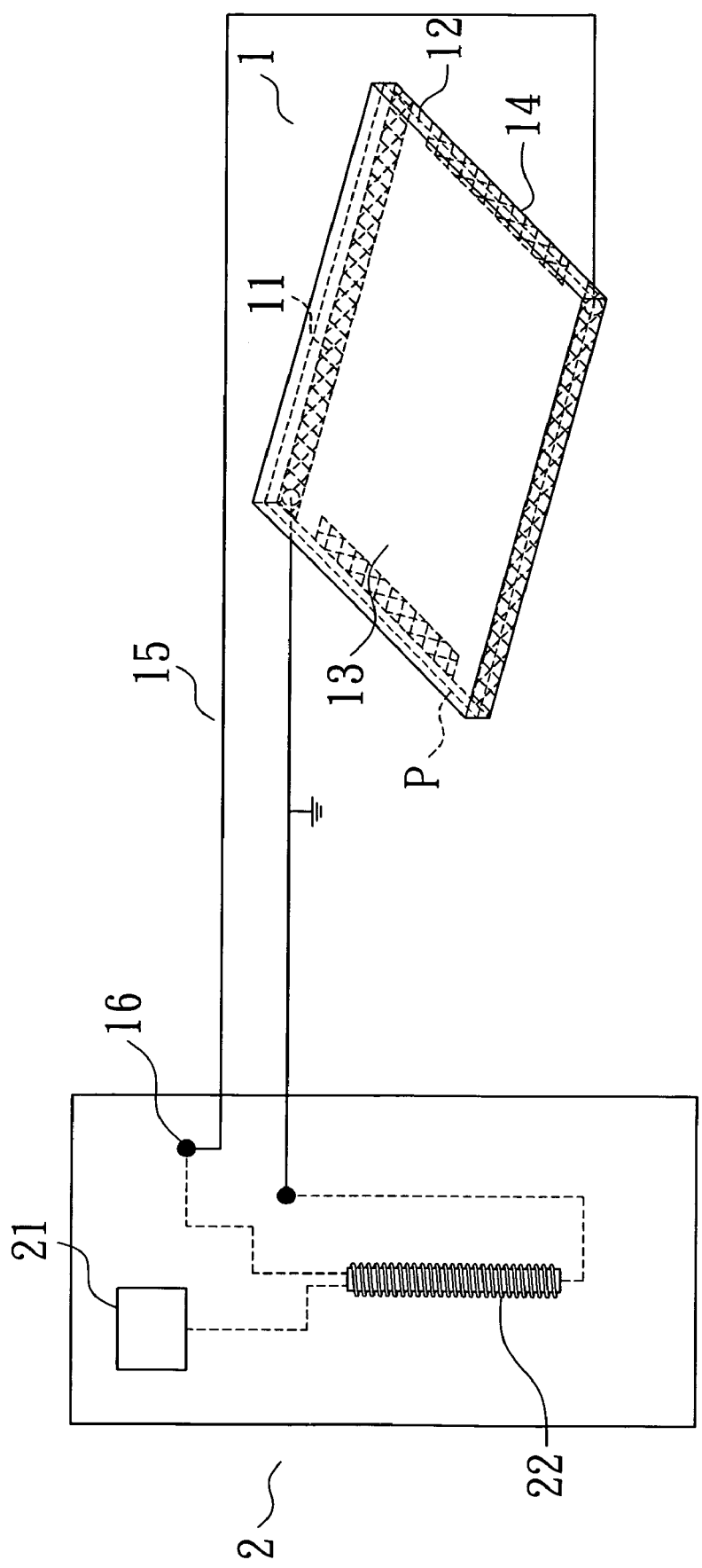
FIG. 2 is a view similar to FIG. 1, illustrating a second embodiment of the external electronic control type electrodeless lamp in accordance with the present invention.
Figure 3:
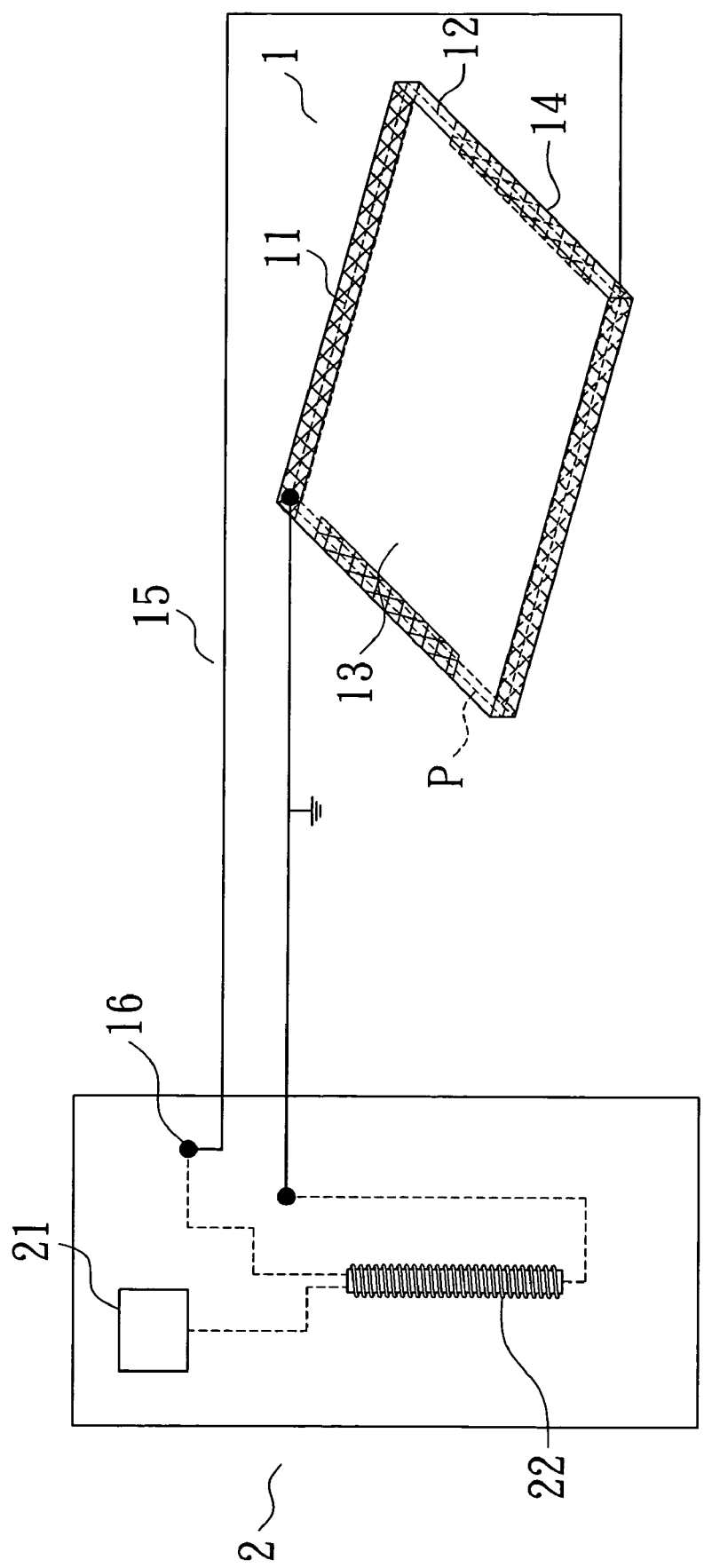
FIG. 3 is a view similar to FIG. 1, illustrating a third embodiment of the external electronic control type electrodeless lamp in accordance with the present invention.
Figure 4:
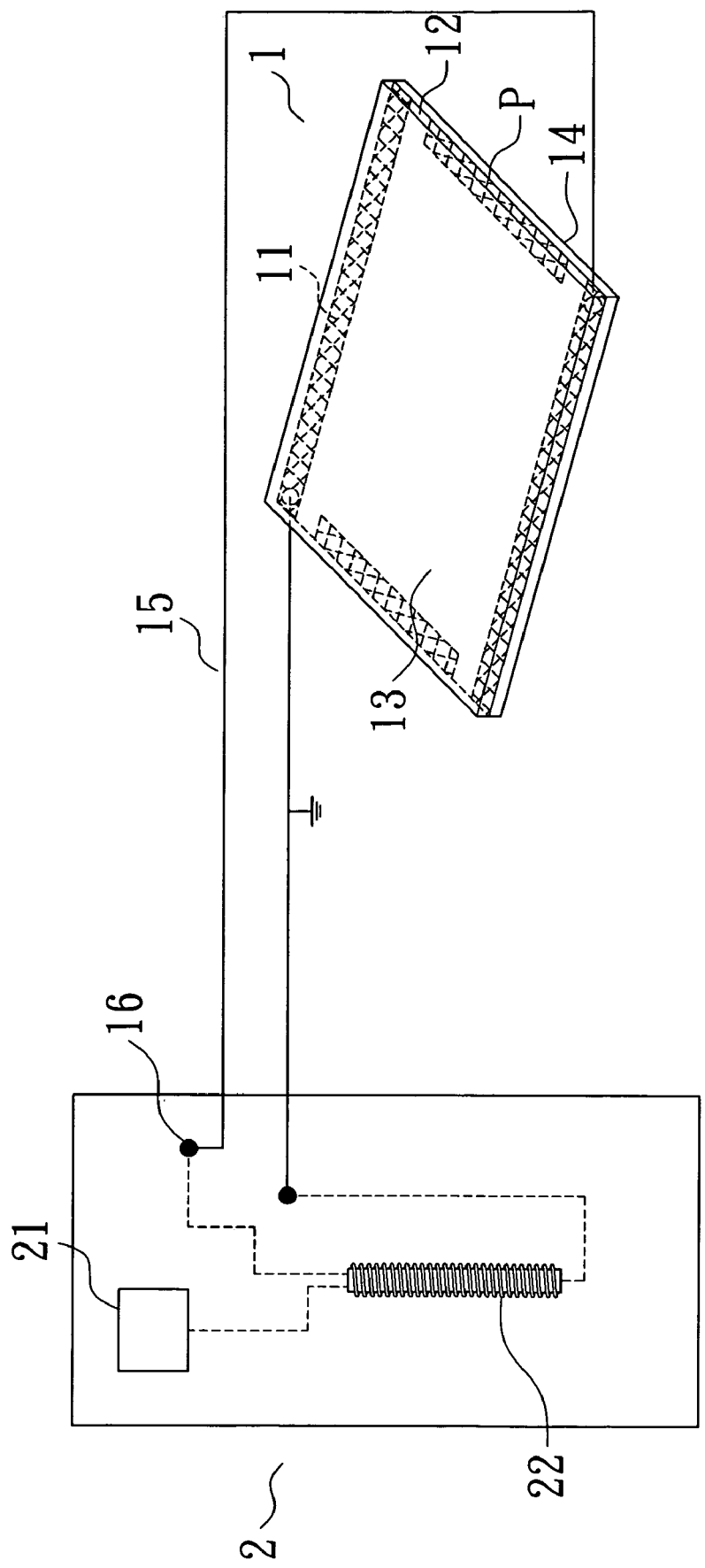
FIG. 4 is a view similar to FIG. 1, illustrating a fourth embodiment of the external electronic control type electrodeless lamp in accordance with the present invention.
Figure 5:
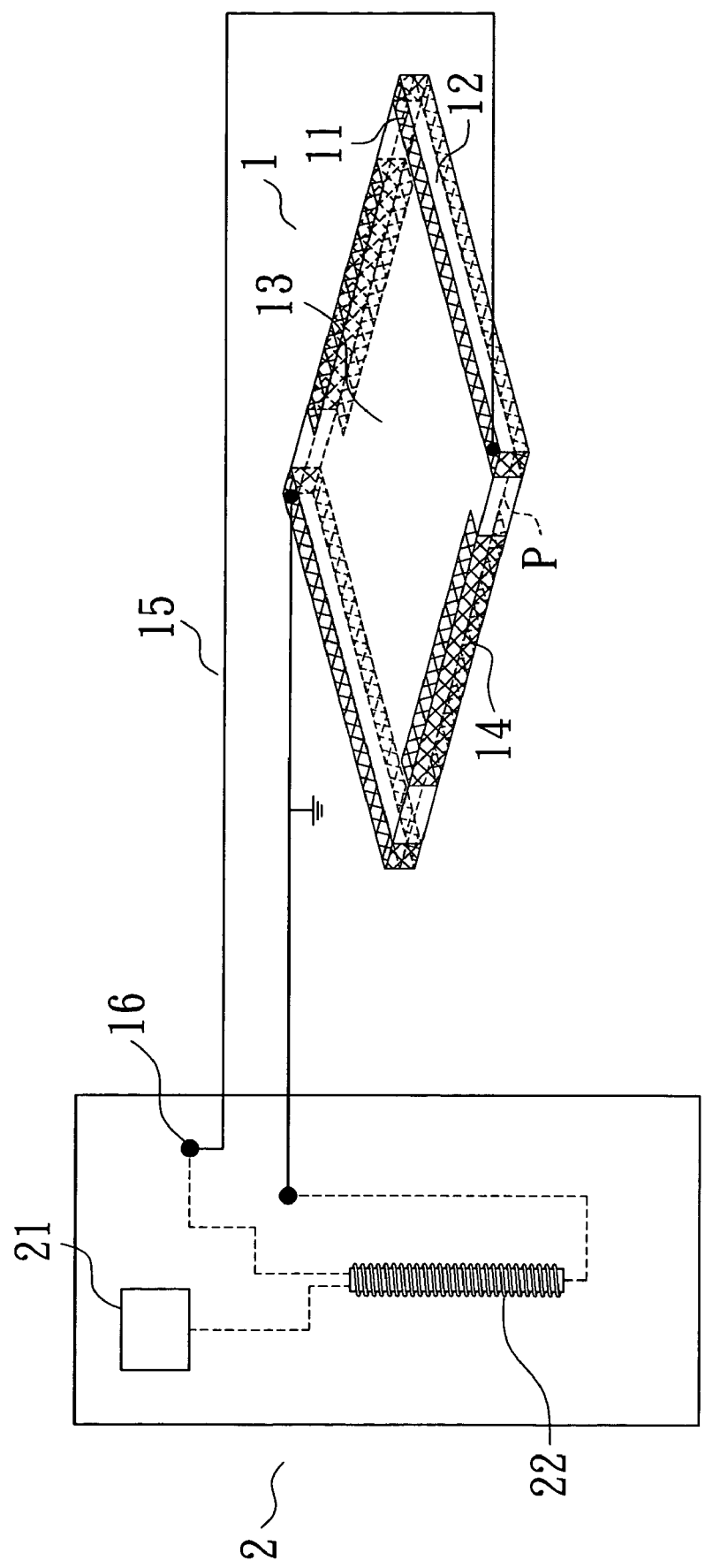
FIG. 5 is a view similar to FIG. 1, illustrating a fifth embodiment of the external electronic control type electrodeless lamp in accordance with the present invention.

Various arrangements of the conductive plates 11 are allowed. In the example shown in FIG. 1, the conductive plates 11 are mounted on a surface of the first plate 13. In the example shown in FIG. 2, the conductive plates 11 are mounted on a surface of the second plate 14. In the example shown in FIG. 3, some of the conductive plates 11 are mounted on a surface of the first plate 13 whereas the remaining conductive plates 11 are mounted on a surface of the second plate 14. In the example shown in FIG. 4, the conductive plates 11 are mounted in the interior space P between the first and second plates 13 and 14. In the example shown in FIG. 5, the conductive plates 11 are mounted along a perimeter of the lighting device 1.

The conductive plates 11 may be distributed in points that form a rectilinear or planar pattern. Further, the conductive plates 11 may be adhered to the lighting device 1 or formed on the lighting device 1 by sputtering.

Figure 6:
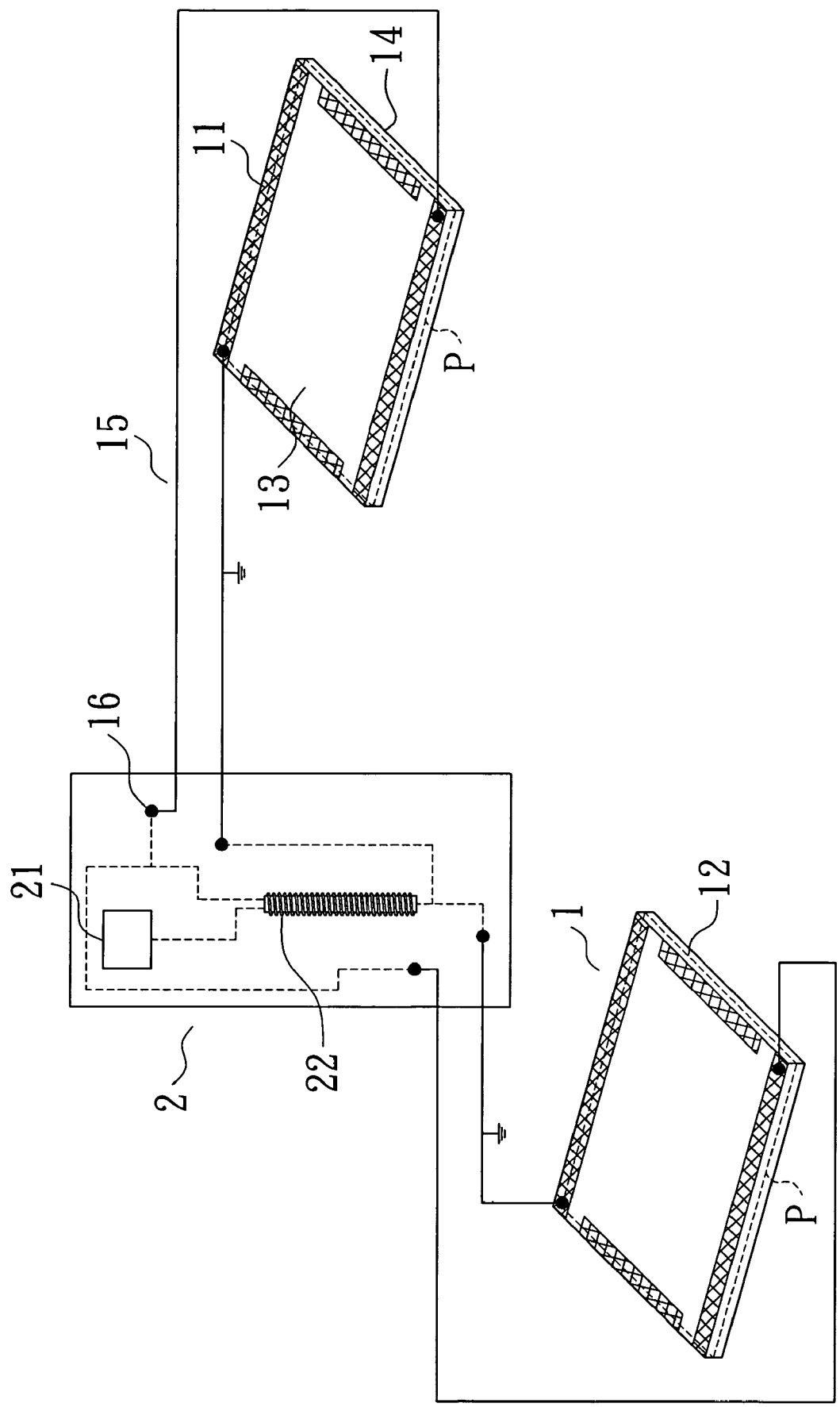
FIG. 6 is a view similar to FIG. 1, illustrating a sixth embodiment of the external electronic control type electrodeless lamp in accordance with the present invention.

With reference to FIG. 6, the electronic control system 2 may be connected to more than one lighting device 1, allowing flexible designs and separate control of the lighting devices 1.

Figure 7:
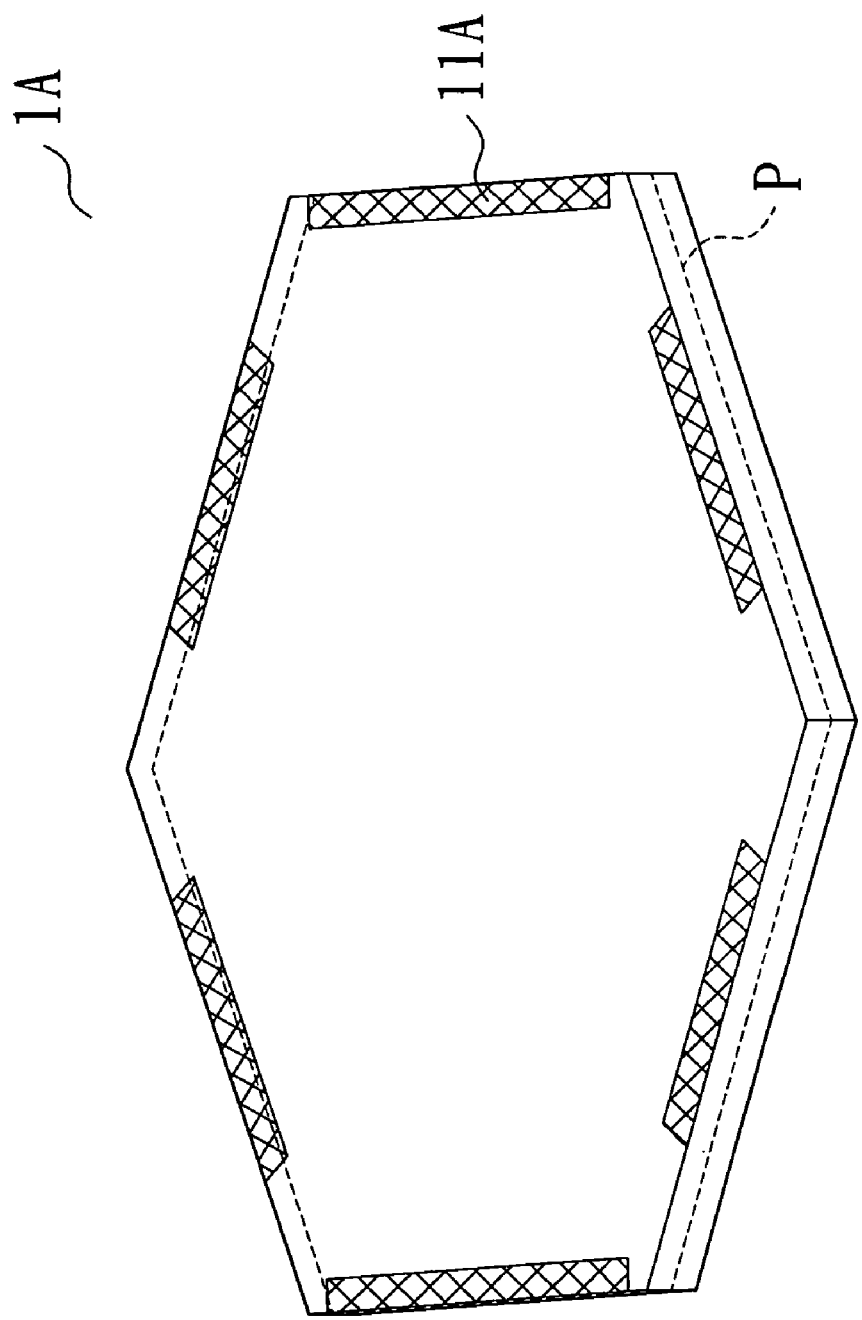
FIG. 7 is a perspective view illustrating another example of a lighting device of the present invention.
Figure 8:
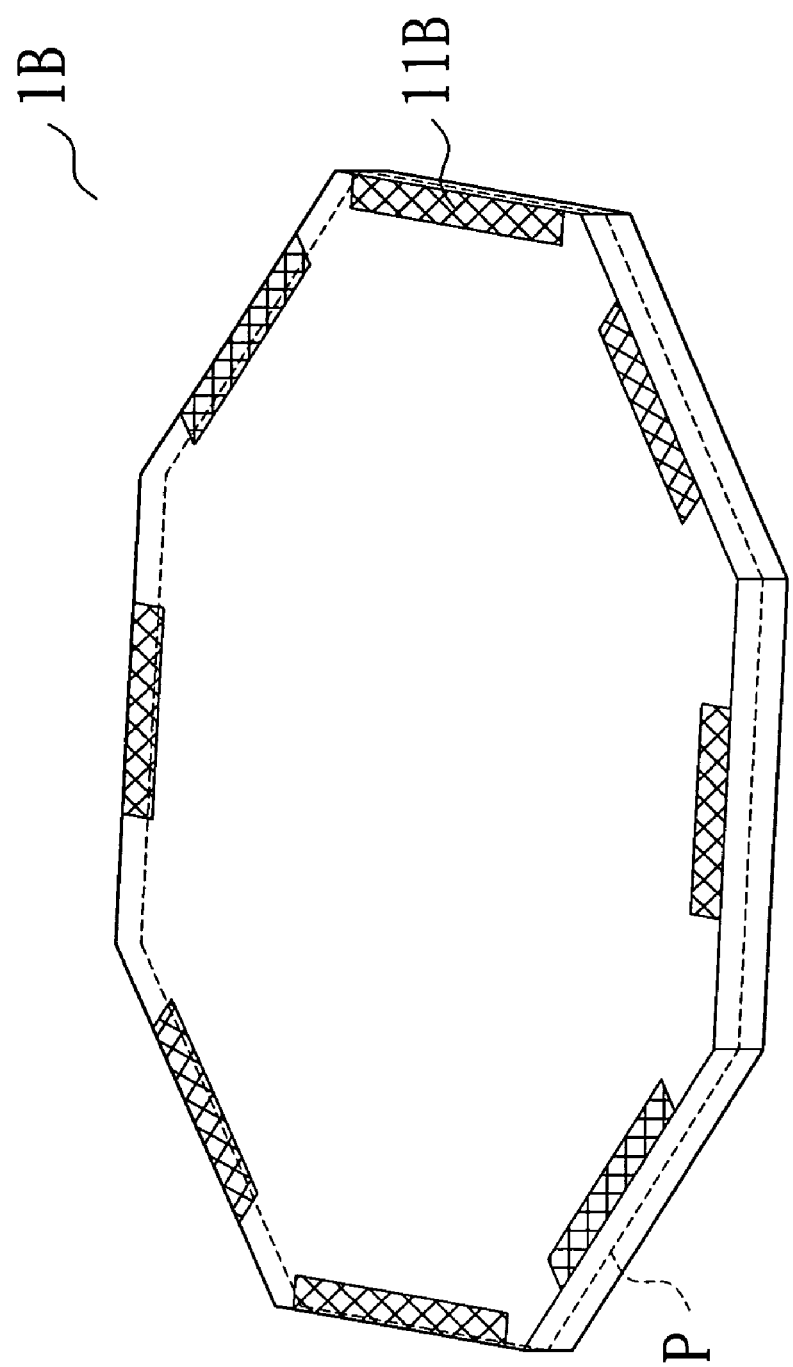
FIG. 8 is a perspective view illustrating a further example of the lighting device of the present invention.

With reference to FIG. 7, the body of the lighting device 1A may be hexagonal, with the conductive plates 11A mounted on at least two opposite sides of the body. With reference to FIG. 8, the body of the lighting device 1B may be octagonal, with the conductive plates 11B mounted on at least two opposite sides of the body.

By mounting the conductive plates 11, 11A, 11B on at least two opposite sides of the body of the lighting device 1, 1A, 1B, the magnetic fields generated cross each other to provide a synergism effect.

Although specific embodiments have been illustrated and described, numerous modifications and variations are still possible. The scope of the invention is limited by the accompanying claims.

What is claimed is:

1. An external electronic control type electrodeless lamp comprising:
    an electronic control system;
    a lighting device including at least:
        a first lamp plate;
        a second lamp plate coupled to said first lamp plate;
        a frame for supporting said first and second lamp plates, defining an interior space in the lighting device;
        a first conductive plate; and
        a second conductive plate, each of said conductive plates being disposed on an exterior surface of at least one lamp plate and electrically connected to said electronic control system external to said lighting device, said electronic control system includes a magnetic core that, when energized, creates a magnetic field, whereby current generated due to change in the magnetic field is supplied to said conductive plates to light the lighting device.

2. The external electronic control type electrodeless lamp as claimed in claim 1 wherein:
    said lighting device has a plurality of even-numbered sides, the number of said sides of said lighting device is at least four, said conductive plates are mounted on at least two opposite sides of said lighting device.

3. The external electronic control type electrodeless lamp as claimed in claim 1 wherein said conductive plates are mounted on a surface of said first lamp plate.

4. The external electronic control type electrodeless lamp as claimed in claim 1 wherein some of said conductive plates are mounted on a surface of said first lamp plate and the remaining conductive plates are mounted on a surface of said second lamp plate.

5. The external electronic control type electrodeless lamp as claimed in claim 1 wherein said conductive plates are mounted along a perimeter of said lighting device.

6. The external electronic control type electrodeless lamp as claimed in claim 1 wherein said conductive plates are distributed in points to form a rectilinear or planar pattern.

7. The external electronic control type electrodeless lamp as claimed in claim 1 wherein two of said conductive plates adjacent to each other have a gap therebetween.

8. The external electronic control type electrodeless lamp as claimed in claim 1 wherein said conductive plates are adhered to said lighting device.

9. The external electronic control type electrodeless lamp as claimed in claim 1 wherein said conductive plates are formed on said lighting device by sputtering.

10. An external electronic control type electrodeless lamp comprising:
    an electronic control system;
    a lighting device including at least:
        a first lamp plate;
        a second lamp plate coupled to said first lamp plate;
        a frame for supporting said first and second lamp plates, defining an interior space in the lighting device;
        a first conductive plate; and
        a second conductive plate, each of said conductive plates being disposed in said interior space and electrically connected to said electronic control system external to said lighting device, said electronic control system includes a magnetic core that, when energized, creates a magnetic field, whereby current generated due to change in the magnetic field is supplied to said conductive plates to light the lighting device.

* * * * *